Aug. 10, 1943.    N. E. LINDENBLAD ET AL    2,326,662
MEANS FOR INVESTIGATING ETHER PROPAGATION PATHS
Filed Nov. 29, 1941
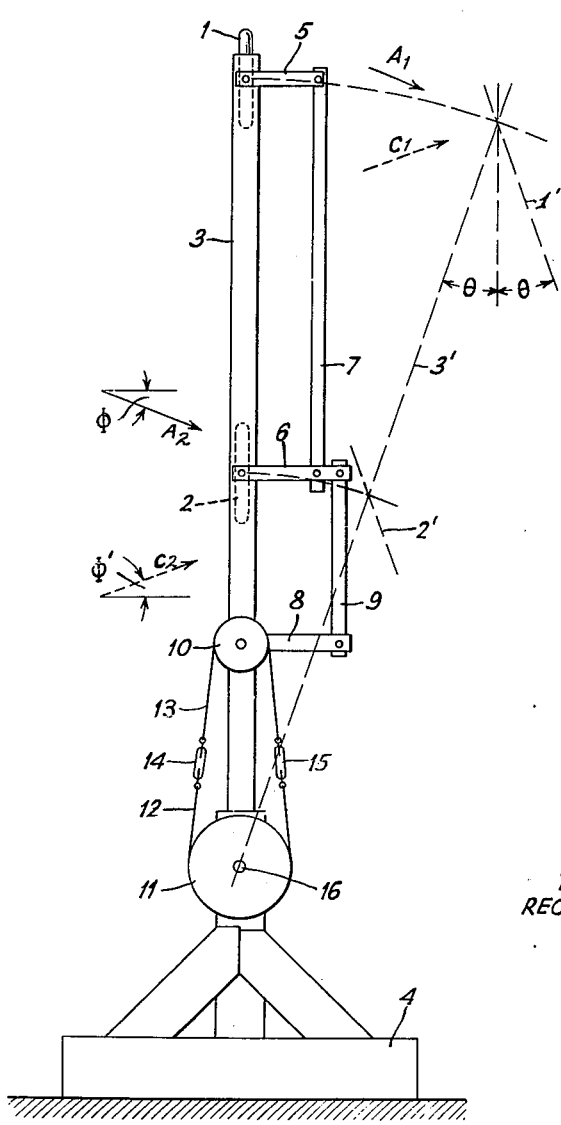
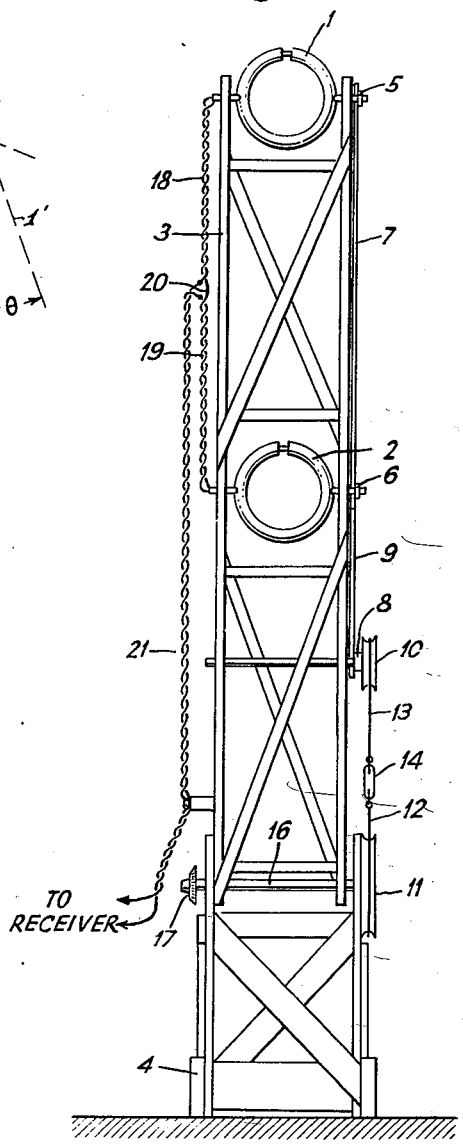
INVENTORS
NILS E. LINDENBLAD
BY JAMES D. FINCH
ATTORNEY Patented Aug. 10, 1943

2,326,662

UNITED STATES PATENT OFFICE 2,326,662

MEANS FOR INVESTIGATING ETHER PROPAGATION PATHS

Nils E. Lindenblad, Rocky Point, and James L. Finch, East Rockaway, N. Y., assignors to Radio Corporation of America, a corporation of Delaware Application November 29, 1941, Serial No. 420,935

12 Claims. (Cl. 250—11)

The present invention relates to directional antennas particularly adapted to the measurement of the vertical arrival angle of radio signals over ether propagation paths.

An object of the present invention is the operation of an antenna structure which provides a direct and accurate measurement of the angle of arrival of radio signals.

Another object of the present invention is the provision of an antenna structure for determining the vertical angle of arrival of received radio signals.

Still another object of the present invention is to facilitate investigation of the propagation paths of high frequency radio signals between a transmitter and a receiver.

The foregoing objects, and others which may appear from the following detailed description, are attained, in accordance with the principles of the present invention, by transmitting short and equally timed impulses of radio frequency energy from a transmitter and receiving these impulses on a pair of loop antennas arranged to be simultaneously tilted at various vertical angles to obtain a minimum response to arriving signals and thus determine their particular angle of arrival.

The present invention is particularly designed for a frequency range of from three to twenty-five megacycles though its operation is not limited to this range. The impulses may be of the order of 100 micro-seconds in length and spaced 1/30 of a second.

The present invention is particularly directed toward the termination of the angles with the horizontal at which the various elements of the received signal arrive. It is well known that radio signals of these frequencies arrive over more than one major path, the different major paths being determined by the number of times the signal is reflected from the ionized layers in the upper atmosphere.

In the application of the present invention the received signals are impressed on the vertical axis of a cathode ray oscilloscope. A sweep frequency of the frequency of pulse transmission is impressed on the horizontal axis. Thus a pulse appears on the oscilloscope screen for each major ether path. While keeping the oscilloscope screen in view the operator orients the loops so that one of these pulses goes to a minimum. From the orientation of these loops to obtain this result the angle of arrival of this particular pulse can be determined.

The present invention will be more fully understood by reference to the following detailed description, which is accompanied by a drawing in which Figure 1 illustrates a side view of an antenna constructed according to the present invention, while Figure 2 is a front view thereof.

In Figure 1, reference characters 1 and 2 indicate a pair of loop antennas. Loop antennas 1 and 2 are preferably metal enclosed loops of insulated wire, the metal enclosure being discontinuous at the uppermost point so as not to act as a short circuit on the winding. The loops are supported on a frame 3 which, in turn, is supported on a base 4. Frame 3, base 4 and the larger parts of the structure are all preferably made of insulated material, such as wood, in order not to distort the received signal pattern. Loops 1 and 2 are supported by projections which serve as bearings about which the loops can be rotated. The loops are rotated by means of arms 5 and 6 which are linked together by a connecting rod 7. Arms 5 and 6 and rod 7 are so proportioned and arranged that when member 6 is rotated about the axis of rotation of loop 2, loop 2 will turn with it and loop 1 will also turn a similar amount in the same direction thus always maintaining the planes of the two loops parallel. A drum 10 is rotatably mounted on frame 3 and has an arm 8 rigidly attached thereto. Arm 8 is coupled to arm 6 by a connecting rod 9 so arranged that arms 5 and 6 are caused to rotate whenever drum 10 is rotated and such that these rotations are equal in amount and in the same direction. A drum 11 is secured to base 4 coaxially with bearing shaft 16 which supports framework 3 on base 4. Cables 12 and 13 pass around drums 11 and 10, respectively, and are secured to them so as to prevent any slippage. Turnbuckles 14 and 15 connect cables 12 and 13 and allow for angular adjustment between 10 and 11. The effective diameter of drum 10 is exactly half the effective diameter of drum 11. With this arrangement when frame 3 is tilted by a particular angle cables 12 and 13 cause drum 10 to rotate in the opposite direction by an equal angle. The connecting rod and arm linkage rotates loops 1 and 2 through the same angle as drum 10. Thus, when frame 3 is moved back to a position as indicated by 3', the loops 1 and 2 tilt forward by an equal amount of rotation as indicated by lines 1' and 2'. Thus, if the frame assumes an angle $\theta$ with the vertical the loops also assume an angle $\theta$ with the vertical but in the opposite direction. The angle to which frame 3 is tilted can be read on a dial 17 calibrated in degrees and normally so arranged that the reading is zero when the frame is vertical, as shown in Figure 2. Loops 1 and 2 have transmission lines 18 and 19 connected thereto and are connected in series in phase opposition at junction 20 to transmission line 21, which is connected to receiving equipment. The receiving equipment may include a cathode ray oscilloscope having vertical and horizontal deflecting means associated therewith. The received signals are applied to the vertical deflection means so that a vertical pulse appears on the lines traced across the oscilloscope screen for each ether path traversed by the received signal. The horizontal sweep frequency is preferably the same as the frequency of pulse transmission.

While keeping the oscilloscope screen in view the operator orients the loops by swinging frame 3 so that one of the pulses goes to a minimum. This occurs when each loop receives identical radio frequency signals as regards both amplitude and phase as will occur when loops 1 and 2 are both normal to the wave front of a particular received signal, for example, that indicated by arrows $A_1$, $A_2$ at an angle $\Phi$ with respect to the horizontal. Due to the inherent directional effect of the loops neither loop is responsive to radio signals arriving along a line at right angles to the planes of the loops. Thus, a signal component which is reflected up from the earth from a short distance in front of the loops, such as that indicated by arrows $C_1$, $C_2$ at an angle $\Phi'$, arrives at right angles to the loops and, therefore, sets up no voltages therein. If the trace on the cathode ray oscilloscope screen indicates that a particular signal impulse is received over a plurality of different paths the angle of arrival of each of the pulses may be successively measured by successively adjusting the angle of frame 3 until each pulse in succession goes to a minimum.

No particular means for tilting frame 3 have been shown since any suitable mechanical device will be satisfactory for this purpose. Furthermore, it is considered within the scope of the present invention to utilize any mechanical arrangement to maintain the loops 1 and 2 in the relative positions and at their relative angles as described above. Also, any device other than the oscilloscope described for differentiating between signal elements arriving at slightly different times and for detecting the intensity of these signal elements may be used.

While we have particularly shown and described several embodiments of our invention, it is to be clearly understood that our invention is not limited thereto but that modifications may be made within the scope of the invention.

We claim:

1. A directional antenna system including a pair of loop antennas rotatably mounted on supporting means, said supporting means being adapted to be rotated in the plane of a propagation path of a radio signal, means for simultaneously rotating said loops the same amount as, but in the opposite direction to, the rotation of said supporting means and means for connecting said loops in series in a phase opposing relationship to signal transducer means.

2. A directional antenna system including a pair of loop antennas rotatably mounted on supporting means, said supporting means being adapted to be rotated in the plane of a propagation path of a radio signal, means for simultaneously rotating said loops the same amount as, but in the opposite direction to, the rotation of said supporting means and means for connecting said loops in a phase opposing relationship to signal transducer means.

3. A directional antenna system including a frame adapted to be pivoted in a vertical plane of a propagation path of a radio signal about an axis at one end adjacent to the earth's surface, a pair of rotatable loop antennas supported at spaced points on said frame, means for rotating said loops the same amount as, but in an opposing direction to, the rotation of said frame about its axis.

4. A directional antenna system including a frame adapted to be pivoted in a vertical plane of a propagation path of a radio signal about an axis at one end adjacent to the earth's surface, a pair of rotatable loop antennas supported at spaced points on said frame, means responsive to a movement of said frame about said axis for rotating said loops the same amount as, but in an opposing direction to, the rotation of said frame about its axis.

5. A directional antenna system including a frame adapted to be pivoted in a vertical plane of a propagation path of a radio signal about an axis at one end adjacent to the earth's surface, a pair of rotatable loop antennas supported at spaced points on said frame, means for rotating said loops the same amount as, but in an opposing direction to, the rotation of said frame about its axis and means for coupling said loops in series in phase opposing relationship to signal transducer means.

6. A directional antenna system including an elongated frame adapted to be pivoted about an axis at one end adjacent to the earth's surface in a vertical plane of a propagation path of a radio signal, a pair of spaced rotatable loop antennas supported on said frame and having their axes of rotation parallel to the pivoting axis of said frame, means for causing said loops to rotate in response to the motion of said frame about its axis an amount equal to the movement of said frame but in the opposite direction thereto.

7. A directional antenna system including an elongated frame adapted to be pivoted about an axis at one end adjacent to the earth's surface in a vertical plane of a propagation path of a radio signal, a pair of spaced rotatable loop antennas supported on said frame and having their axes of rotation parallel to the pivoting axis of said frame, means for causing said loops to rotate in response to the motion of said frame about its axis an amount equal to the movement of said frame but in the opposite direction thereto, and means for coupling said loops in series in phase opposing relationship to signal transducer means.

8. A directional antenna system including an elongated frame adapted to be pivoted about an axis at one end adjacent to the earth's surface in a vertical plane of a propagation path of a radio signal, a pair of spaced rotatable loop antennas supported on said frame and having their axes of rotation parallel to the pivoting axis of said frame, means for causing said loops to rotate in response to the motion of said frame about its axis an amount equal to the movement of said frame, but in the opposite direction thereto, and means for coupling said loops in series in phase opposing relationship to signal transducer means and means for determining the angle which said frame forms with respect to the earth's surface.

9. A directional antenna system including an elongated frame adapted to be pivoted in a vertical plane about an axis at one end adjacent to the earth's surface, a pair of rotatable loop antennas spaced along said frame, a drum concentric with the axis of said frame and fixed in position with respect to the earth's surface, a second drum mounted for rotation on said frame, means for coupling said loops and said second drum together for equal simultaneous rotation in the same direction and a cable passing around and attached to said drums.

10. A directional antenna system including an elongated frame adapted to be pivoted in a vertical plane about an axis at one end adjacent to the earth's surface, a pair of rotatable loop antennas spaced along said frame, a fixed drum concentric with the axis of said frame, a second drum mounted for rotation on said frame, means for coupling said loops and said second drum together for equal simultaneous rotation in the same direction and a cable passing around and attached to said drums whereby a movement of said frame about its axis causes rotation of said loop antennas about their axes of rotation.

11. A directional antenna system including an elongated frame adapted to be pivoted in a vertical plane about an axis at one end adjacent to the earth's surface, a pair of rotatable loop antennas spaced along said frame, a drum concentric with the axis of said frame and fixed in position with respect to the earth's surface, a second drum mounted for rotation on said frame, means for coupling said loops and said second drum together for equal simultaneous rotation in the same direction, a cable passing around and attached to said drums and means for coupling said loop antennas in series and in a phase opposing relationship to signal transducer means.

12. A directional antenna system including an elongated frame adapted to be pivoted in a vertical plane about an axis at one end adjacent to the earth's surface, a pair of rotatable loop antennas spaced along said frame, a drum concentric with the axis of said frame and fixed in position with respect to the earth's surface, a second drum mounted for rotation on said frame, means for coupling said loops and said second drum together for equal simultaneous rotation in the same direction, a cable passing around and attached to said drums and means for coupling said loop antennas in a phase opposing relationship to signal transducer means.

NILS E. LINDENBLAD.
JAMES L. FINCH.